(12) United States Patent      (10) Patent No.:   US 12,587,879 B2

Usuba et al.      (45) Date of Patent:   ***Mar. 24, 2026

(54) LOCAL 5G MONITORING SYSTEM AND MEASUREMENT DATA PROVIDING METHOD THEREOF

(71) Applicant: ANRITSU CORPORATION, Kanagawa (JP)

(72) Inventors: Mitsuhiro Usuba, Kanagawa (JP); Atsushi Furuki, Kanagawa (JP); Yoshihiro Fukagawa, Kanagawa (JP); Satoshi Sasaki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 438 days.

This patent is subject to a terminal disclaimer.

(21) Appl. No.: 18/068,850

(22) Filed: Dec. 20, 2022

(65) Prior Publication Data

US 2023/0292160 A1     Sep. 14, 2023

(30) Foreign Application Priority Data

Mar. 9, 2022    (JP) ................................. 2022-036358

(51) Int. Cl.

| | |
|---|---|
| *H04W 24/08* | (2009.01) |
| *H04W 24/10* | (2009.01) |
| *H04W 84/12* | (2009.01) |

(52) U.S. Cl.

CPC ........... *H04W 24/08* (2013.01); *H04W 24/10* (2013.01); *H04W 84/12* (2013.01)

(58) Field of Classification Search

CPC ..... H04W 24/08; H04W 24/10; H04W 84/10; H04W 84/12

See application file for complete search history.

(56) References Cited

U.S. PATENT DOCUMENTS

| | | | |
|---|---|---|---|
| 2012/0215834 A1* | 8/2012 | Chen ....................... | H04L 67/01 |
| | | | 709/203 |
| 2020/0228602 A1* | 7/2020 | Spoczynski ............. | H04L 67/56 |

(Continued)

FOREIGN PATENT DOCUMENTS

| | | | | | |
|---|---|---|---|---|---|
| EP | | 2900016 A1 * | 7/2015 | ............ | H04W 48/18 |
| JP | 2014064221 A | * | 4/2014 | | |

(Continued)

OTHER PUBLICATIONS

English translation of WO-2021059842-A1 2021.*
English translation of JP-2014064221-A 2014.*

*Primary Examiner* — Asad M Nawaz

(74) *Attorney, Agent, or Firm* — McDonald Hopkins LLC

(57) ABSTRACT

The local 5G monitoring system includes measuring devices that measure radio waves from a base station of the local 5G system, a first server device that belongs to the same local area network (LAN) as the measuring devices, and collects measurement data from the measuring devices, and a second server device that is connected to the first server device via the Internet, and is configured to be referred to by a user, in which the first server device uses the measurement data from the measuring devices when installation of the local 5G system is completed, as reference information, and determines and notifies the user that an abnormal state occurs, when the measurement data from the measuring devices during an operation of the local 5G system exceeds a threshold from the reference information.

8 Claims, 2 Drawing Sheets

Reference information database          Measurement result

Reference information

| | Measuring device 2a | Measuring device 2b | Measuring device 2c | Measuring device 2d | Measuring device 2e |
|---|---|---|---|---|---|
| Position | A | B | C | D | E |
| Radio waves | W a | W b | W c | W d | W e |
| Throughput | T a | T b | T c | T d | T e |
| Delay | D a | D b | D c | D d | D e |

(56)     References Cited

U.S. PATENT DOCUMENTS

| | | | | |
|---|---|---|---|---|
| 2020/0259896 A1 * | 8/2020 | Sachs | ...................... | H04W 4/30 |
| 2021/0136603 A1 * | 5/2021 | Kottkamp | ................ | G06N 3/08 |
| 2022/0294715 A1 * | 9/2022 | Agrawal | ............. | H04L 63/1408 |
| 2023/0292159 A1 * | 9/2023 | Usuba | ................... | H04W 24/04 |

FOREIGN PATENT DOCUMENTS

| | | | | |
|---|---|---|---|---|
| JP | 5783263 B2 * | 9/2015 | .......... | H04J 11/0053 |
| WO | 2020-251057 A1 | 12/2020 | | |
| WO | WO-2021059842 A1 * | 4/2021 | | |

* cited by examiner

Measurement result

| | Measuring device 2a | Measuring device 2b | Measuring device 2c | Measuring device 2d | Measuring device 2e |
|---|---|---|---|---|---|
| Position | A | B | C | D | E |
| Radio waves | Wa | Wb | Wc | Wd | We |
| Throughput | Ta | Tb | Tc | Td | Te |
| Delay | Da | Db | Dc | Dd | De |

Reference information database

Reference information

FIG.2

LOCAL 5G MONITORING SYSTEM AND MEASUREMENT DATA PROVIDING METHOD THEREOF

TECHNICAL FIELD

The present invention relates to a local 5 G monitoring system for monitoring the operational performance of a local 5G system.

BACKGROUND ART

Local 5G systems have been provided in which by using the various techniques used in the fifth generation mobile communication system (hereinafter also referred to as "5G"), organizations (local governments, companies, or the like) that are not telecommunications carriers have facilities and uses the facilities for exclusively providing services on land it owns or as self-employed communication facilities. Note that the local 5G system is sometimes called a private 5G system.

After such a local 5G system is installed in the user's actual field, in subsequent operations, abnormal states such as a decrease in a transmission speed or communication delay may occur due to factors such as equipment failure or stoppage and radio interference.

Unlike a network configuration using a relatively inexpensive wireless local area network (LAN), the local 5G system is an expensive system that emphasizes large capacity and low delay, and a time when abnormal states such as a decrease in a transmission speed or communication delay occur needs to be kept extremely short.

Patent Document 1 describes that a wireless mesh network is monitored by a plurality of communication devices and measurement data is stored in a server.

RELATED ART DOCUMENT

Patent Document

[Patent Document 1] WO2020/251057

DISCLOSURE OF THE INVENTION

Problem that the Invention is to Solve

However, there is no system that monitors the operation of the local 5G system and makes a notification when an abnormal state occurs.

For this reason, even if the transmission speed of the local 5G system decreases or the communication delay occurs, it is difficult for the user to perceive these, and as a result of continuing operation without noticing, there is a problem that led to malfunctions of applications and services that require ultra-low delay and high reliability such as medical care and transportation using local 5G systems used by users.

Therefore, an object of the present invention is to provide a local 5G monitoring system that enables checking of the status of an abnormal state when an abnormal state occurs in the local 5G system, and that can quickly respond to the abnormal state.

Means for Solving the Problem

A local 5G monitoring system according to the present invention is a local 5G monitoring system that monitors a local 5G system, and includes a measuring device that measures radio waves from a base station of the local 5G system, a first server device that belongs to the same local area network (LAN) as the measuring device, and collects measurement data from the measuring device, and a second server device that is connected to the first server device via the Internet, and is configured to be referred to by a user, in which the first server device uses the measurement data from the measuring device when installation of the local 5G system is completed, as reference information, and determines and notifies the user that an abnormal state occurs, when the measurement data from the measuring device during an operation of the local 5G system exceeds a threshold from the reference information.

With this configuration, it is possible to notify the user of the occurrence of an abnormal state, enable checking of the status of the abnormal state via the Internet, and to quickly respond to the abnormal state.

Further, in the local 5G monitoring system according to the present invention, the measuring device measures a state of Internet Protocol (IP) data communication in a wireless network of the local 5G system in addition to the radio waves, as the measurement data.

With this configuration, it is possible to detect an abnormal state of the IP data communication of the wireless network of the local 5G system, based on the measurement data when the local 5G system is installed.

Further, in the local 5G monitoring system according to the present invention, there are a plurality of the measuring devices, and the second server device displays the measurement data of each of the measuring devices, for each of the measuring devices.

With this configuration, it is possible to enable checking of the measurement data of each measuring device via the Internet, and it is possible to quickly respond to an abnormal state.

Further, in the local 5G monitoring system according to the present invention, the second server device makes display of the measurement data, from which it is determined as the abnormal state, different from other displays.

With this configuration, the measurement data, from which it is determined as an abnormal state, is displayed differently from other displays, so that it is possible to quickly identify the measurement data in the abnormal state, and quickly respond to the abnormal state.

In addition, a measurement data providing method according to the present invention is a measurement data providing method of a local 5G monitoring system that includes a measuring device that measures radio waves from a base station of a local 5G system, and monitors the local 5G system, the method including a step of collecting measurement data from the measuring device during an operation of the local 5G system; and a step of configuring the measurement data so as to be referred to via the Internet.

With this configuration, it is possible to enable checking of the status of an abnormal state via the Internet, and quickly respond to the abnormal state.

Further, in the measurement data providing method according to the present invention, the measuring device measures a state of Internet Protocol (IP) data communication in a wireless network of the local 5G system in addition to the radio waves, as the measurement data.

With this configuration, it is possible to detect an abnormal state of the IP data communication of the wireless network of the local 5G system, based on the measurement data when the local 5G system is installed.

Advantage of the Invention

The present invention can provide a local 5G monitoring system that enables checking of the status of an abnormal state when an abnormal state occurs in the local 5G system and that can quickly respond to the abnormal state.

BRIEF DESCRIPTION OF THE DRAWINGS

FIG. 2 is a conceptual diagram of an abnormal state detection method for the local 5G monitoring system according to the embodiment of the present invention.

BEST MODE FOR CARRYING OUT THE INVENTION

Figure 1:
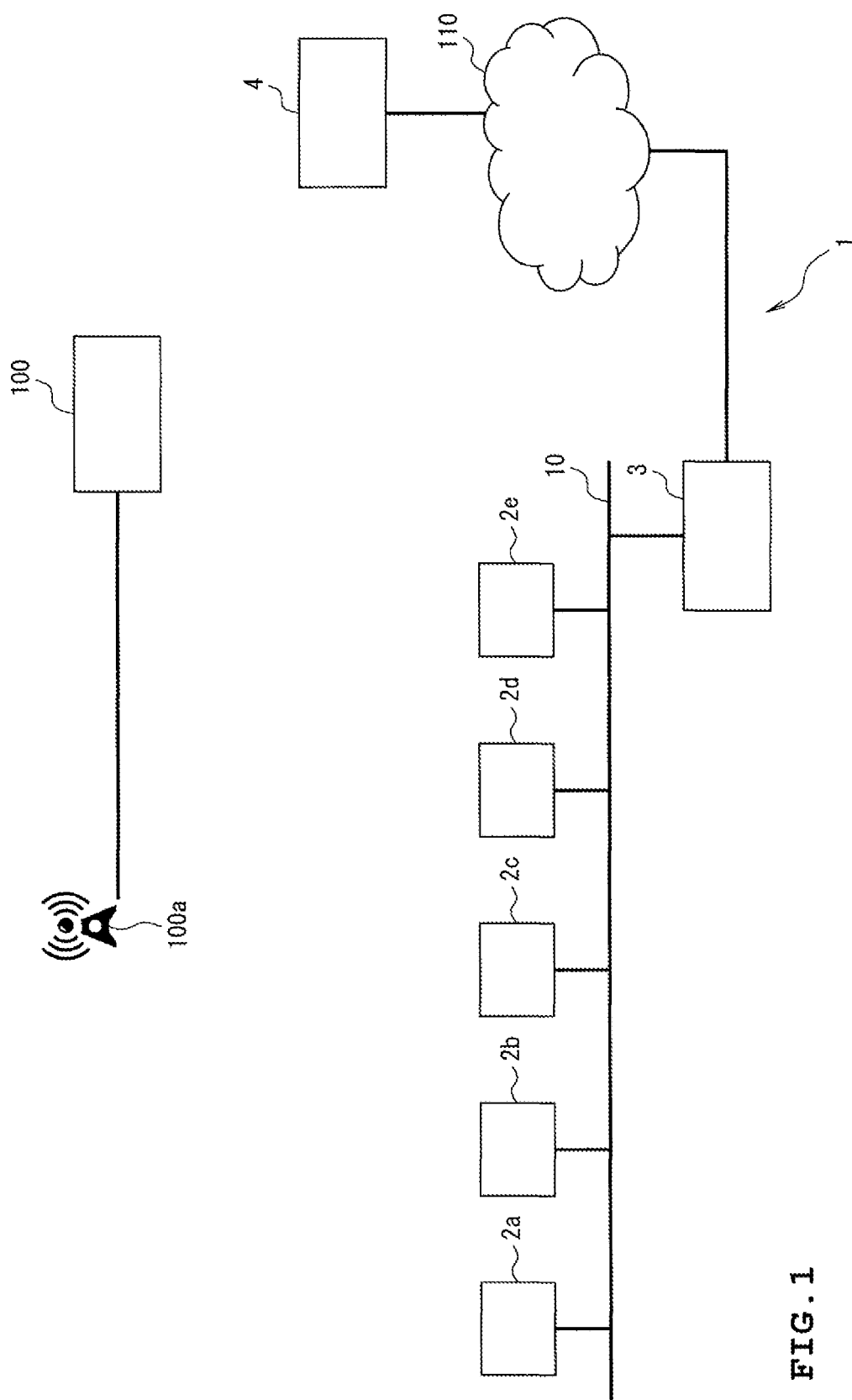
FIG. 1 is a schematic configuration diagram of a local 5G monitoring system according to an embodiment of the present invention.

Hereinafter, a local 5G monitoring system according to an embodiment of the present invention will be described in detail with reference to the drawings.

In FIG. 1, a local 5G monitoring system 1 according to an embodiment of the present invention is installed within the service area of a local 5G system 100.

The local 5G monitoring system 1 monitors the state of radio waves from the base station 100a of the local 5G system 100, the state of IP data communication in the wireless network of the local 5G system 100, and the like, and determines whether an abnormal state occurs.

The local 5G monitoring system 1 includes a plurality of measuring devices 2a, 2b, 2c, 2d, and 2e, a first server device 3, and a second server device 4.

The measuring devices 2a, 2b, 2c, 2d, and 2e measure radio waves from the base station 100a of the local 5G system 100. The measuring devices 2a, 2b, 2c, 2d, and 2e measure IP data communication of the wireless network of the local 5G system 100. The measuring devices 2a, 2b, 2c, 2d, and 2e measure throughput, communication delay, or the like, as IP data communication measurements. As the measuring devices 2a, 2b, 2c, 2d, and 2e, mobile terminals that support 5G communication may be used in addition to normal measuring devices.

The first server device 3 and the second server device 4 are each a computer device. The computer devices each include a central processing unit (CPU), a read only memory (ROM), a random access memory (RAM), a non-volatile storage medium such as a hard disk device, various input/output ports, a display device, and an input device such as a pointing device or a keyboard device, which are not shown.

Programs for controlling the respective computer devices are stored in the ROMs and hard disk devices of these computer devices. That is, the computer device performs the control of the present embodiment, by the CPU executing the programs stored in the ROM and the hard disk device using the RAM as a work area.

The first server device 3 and the measuring devices 2a, 2b, 2c, 2d, and 2e are connected by a LAN 10 such that data can be transmitted and received to and from each other via the LAN 10.

The first server device 3 is connected to the Internet 110, and can transmit and receive e-mails and access social networking service (SNS) via the Internet.

The second server device 4 is connected to the Internet 110, and the first server device 3 and the second server device 4 can transmit and receive data to and from each other via the Internet 110.

The second server device 4 has, for example, a function of a web server, and can provide information to personal computers and smartphones via the Internet 110.

In the present embodiment, the first server device 3 uses the measurement data measured by the measuring devices 2a, 2b, 2c, 2d, and 2e when the local 5G system 100 is installed, as reference information, and makes a notification in a case where the measurement data measured by the measuring devices 2a, 2b, 2c, 2d, and 2e during the operation of the local 5G system 100 exceeds a threshold from the reference information and deteriorate.

In the local 5G system 100, the required throughput, communication delay, or the like is designed, the base station 100a, or the like is installed while performing measurement by the measuring devices 2a, 2b, 2c, 2d, and 2e so as to satisfy the designed throughput and communication delay, and when it is checked that the designed throughput and communication delay are satisfied, the installation is completed.

For example, when registration of reference information is selected by an input to the input device, the first server device 3 stores the measurement data obtained by the measuring devices 2a, 2b, 2c, 2d, and 2e at the time of the selection, as the reference information, in the hard disk device.

For example, as shown in FIG. 2, the first server device 3 stores the measurement data measured by the measuring devices 2a, 2b, 2c, 2d, and 2e when the local 5G system 100 is installed, as reference information, in the reference information database. The reference information database is stored in the hard disk device of the first server device 3, for example.

As the measurement data by the measuring devices 2a, 2b, 2c, 2d, and 2e, for example, as shown in FIG. 2, the state of radio waves (shown as "radio waves" in FIG. 2), throughput, delay, and the like are measured.

As the state of radio waves, for example, Reference Signal Received Power (RSRP), Reference Signal Received Quality (RSRQ), or the like are measured.

Throughput and delay are measured by communicating with, for example, a server device and a measuring device provided in the local 5G system 100.

The measuring devices 2a, 2b, 2c, 2d, and 2e, for example, perform wireless communication with a server device provided in the local 5G system 100 via the base station 100a to measure throughput and delay.

For example, the measuring devices 2a, 2b, 2c, 2d, and 2e transmit an "echo request" packet of Internet Control Message Protocol (ICMP) to the server device, and measure the wireless network delay of the local 5G system 100 by using time until an "echo reply" is returned from the server device (Round-Trip Time).

For example, the first server device 3 compares the measurement data from the measuring devices 2a, 2b, 2c, 2d, and 2e with the reference information at predetermined time intervals, and determines that an abnormal state occurs, when the measurement data exceeds a threshold from the reference information and deteriorates.

For example, the first server device 3 determines that an abnormal state occurs, when at least one of the RSRP values measured by the measuring devices 2a, 2b, 2c, 2d, and 2e exceeds a threshold from the reference information and is reduced.

For example, the first server device 3 determines that an abnormal state occurs, when at least one of the throughputs measured by the measuring devices 2a, 2b, 2c, 2d, and 2e exceeds a threshold from the reference information and is reduced.

For example, the first server device 3 determines that an abnormal state occurs, when at least one of the network delays measured by the measuring devices 2a, 2b, 2c, 2d, and 2e exceeds a threshold from the reference information and increases.

In addition, it is determined that it is abnormal in a case where the measurement data of at least one of the measuring devices 2a, 2b, 2c, 2d, and 2e exceeds a threshold from the reference information and deteriorates, but it may be determined that it is abnormal in a case where the measurement data of a predetermined number of measuring devices 2a, 2b, 2c, 2d, and 2e exceeds a threshold from the reference information and deteriorates.

Further, the threshold may be changed depending on the installation positions of the measuring devices 2a, 2b, 2c, 2d, and 2e.

When detecting that an abnormal state has occurred, the first server device 3 notifies a user of the detection.

The first server device 3 notifies the user by, for example, warning display on a display device or the like, alarm sound by a buzzer or the like, transmission of an e-mail, posting on an SNS, or the like.

The first server device 3 transmits measurement data of the measuring devices 2a, 2b, 2c, 2d, and 2e to the second server device 4.

When detecting that an abnormal state has occurred, the first server device 3 transmits the information to the second server device 4 together with the measurement data of the measuring devices 2a, 2b, 2c, 2d, and 2e. The first server device 3 transmits, to the second server device 4, for example, the information on the measuring devices 2a, 2b, 2c, 2d, and 2e determined to be in an abnormal state, the difference between the measurement data and the threshold, and the like, as abnormal state information.

The second server device 4 accumulates and manages the measurement data received from the first server device 3 in time series such that it can be referred to from, for example, a browser of a personal computer or a smartphone.

The second server device 4 displays measurement data for each of the measuring devices 2a, 2b, 2c, 2d, and 2e, for example, as in the table shown in FIG. 2.

The second server device 4 displays, for example, the measurement data, the measuring devices 2a, 2b, 2c, 2d, and 2e, of which measurement data is determined to be in an abnormal state, in a changed color so as to be displayed differently from other measurement data, measuring devices, for example.

The second server device 4, for example, analyzes the measurement data of each of the measuring devices 2a, 2b, 2c, 2d, and 2e in time series, and displays the measuring devices 2a, 2b, 2c, 2d, and 2e, which have detected a sign of an abnormal state, differently from other measuring devices, by displaying them in different colors, or the like.

The second server device 4 uses, for example, artificial intelligence (AI) to detect the sign of an abnormal state.

The second server device 4 may accumulate and manage measurement data from a plurality of first server devices 3 and provide information via the Internet 110.

By doing so, it is possible to centrally manage a plurality of local 5G systems 100 installed in remote locations, and to efficiently monitor the systems.

Thus, in the above-described embodiment, the first server device 3 uses the measurement data measured by the measuring devices 2a, 2b, 2c, 2d, and 2e when the local 5G system 100 is installed, as reference information, and determines that an abnormal state occurs, and notifies the user of the abnormality, in a case where the measurement data measured by the measuring devices 2a, 2b, 2c, 2d, and 2e during the operation of the local 5G system 100 exceeds a threshold from the reference information and deteriorate.

Thus, it is possible to notify the user of the occurrence of an abnormal state, and quickly respond to the abnormal state.

Further, the second server device 4 is configured to be able to refer to the measurement data of the measuring devices 2a, 2b, 2c, 2d, and 2e via the Internet.

Thus, it is possible to check the status of an abnormal state from a personal computer or a smartphone via the Internet, and quickly respond to the abnormal state.

In addition, by enabling the device vendor of the local 5G monitoring system 1 to refer to the status of the abnormal state via the Internet, technical supports such as factor analysis of the abnormal state can be received, and the response to the abnormal state can be performed quickly.

In addition, by placing the second server device 4 on the cloud platform, it is possible to adjust the monitoring and the monitoring contents of a plurality of local 5G systems 100 flexibly and quickly, thereby efficiently monitoring the system.

Further, the measuring devices 2a, 2b, 2c, 2d, and 2e may be configured to be connectable to the Internet 110, the measurement data of the measuring devices 2a, 2b, 2c, 2d, and 2e may be directly transmitted to the second server device 4, and the second server device 4 may detect an abnormal state, or notify the user by transmitting an e-mail or posting to SNS, or make the measurement data be referred to.

Although an embodiment of the present invention has been disclosed, it will be apparent that modifications may be made by those skilled in the art without departing from the scope of the present invention. All such modifications and equivalents are intended to be included in the following claims.

DESCRIPTION OF REFERENCE NUMERALS AND SIGNS

1: Local 5G monitoring system
2a, 2b, 2c, 2d, 2e: Measuring device
3: First server device
4: Second server device
100: Local 5G system
100a: Base station

What is claimed is:

1. A local 5G monitoring system that monitors a local 5G system, comprising:

a plurality of measuring devices comprising at least one mobile terminal that support 5G communication and at least one measurement device that measures radio waves from a base station of the local 5G system;

a first server device that belongs to the same local area network (LAN) as the plurality of measuring devices, and collects measurement data from the plurality of measuring devices; and a second server device not belonging to the LAN network that is connected to the first server device via the Internet, and is configured to be referred to by a user, wherein the first server device is configured to transmit the measurement data to the second server device via the Internet, wherein the first server device uses the measurement data from the plurality of measuring devices when installation of the local 5G system is completed, as reference information, and determines and notifies the user that an abnormal state occurs, when the measurement data from the plurality of measuring devices during an operation of the local 5G system exceeds a threshold from the reference information, wherein the first server determines an abnormal state based on whether measurement data of a predetermined number of measuring devices exceeds a threshold from the reference information and deteriorates, and wherein the threshold is based on the installation position of the measuring devices.

2. The local 5G monitoring system according to claim 1, wherein the plurality of measuring devices measures a state of Internet Protocol (IP) data communication in a wireless network of the local 5G system in addition to the radio waves, as the measurement data.

3. The local 5G monitoring system according to claim 1, wherein the second server device displays the measurement data of each of the measuring devices, for each of the measuring devices.

4. The local 5G monitoring system according to claim 3, wherein the second server device makes display of the measurement data, from which it is determined as the abnormal state, different from other displays.

5. The local 5G monitoring system according to claim 1, wherein the second server displays measurement devices that have measurement data exceeding the threshold differently from measuring devices that do have measurement data exceeding the threshold.

6. A measurement data providing method of a local 5G monitoring system that includes a plurality of measuring devices comprising at least one mobile terminal that support 5G communication and at least one measurement device that measures radio waves from a base station of a local 5G system, and monitors the local 5G system, the method comprising:

a step of collecting measurement data from the measuring device during an operation of the local 5G system;

a step of configuring the measurement data so as to be referred to via the Internet; and a step of transmitting the measurement data from a first server to a second server via the Internet, the first server and second server not belonging to a same local area network (LAN), wherein the first server determines an abnormal state based on whether measurement data of a predetermined number of measuring devices exceeds a threshold from the reference information and deteriorates, and wherein the threshold is based on the installation position of the measuring devices.

7. The measurement data providing method according to claim 6, wherein the plurality of measuring devices measure a state of Internet Protocol (IP) data communication in a wireless network of the local 5G system in addition to the radio waves, as the measurement data.

8. The measurement data providing method according to claim 6, wherein the second server displays measurement devices that have measurement data exceeding the threshold differently from measuring devices that do have measurement data exceeding the threshold.

\* \* \* \* \*